Oct. 21, 1969   L. A. GAMBINO   3,473,257
CHILDREN'S BUILD-IT-YOURSELF TOY
Filed July 24, 1967   4 Sheets-Sheet 1
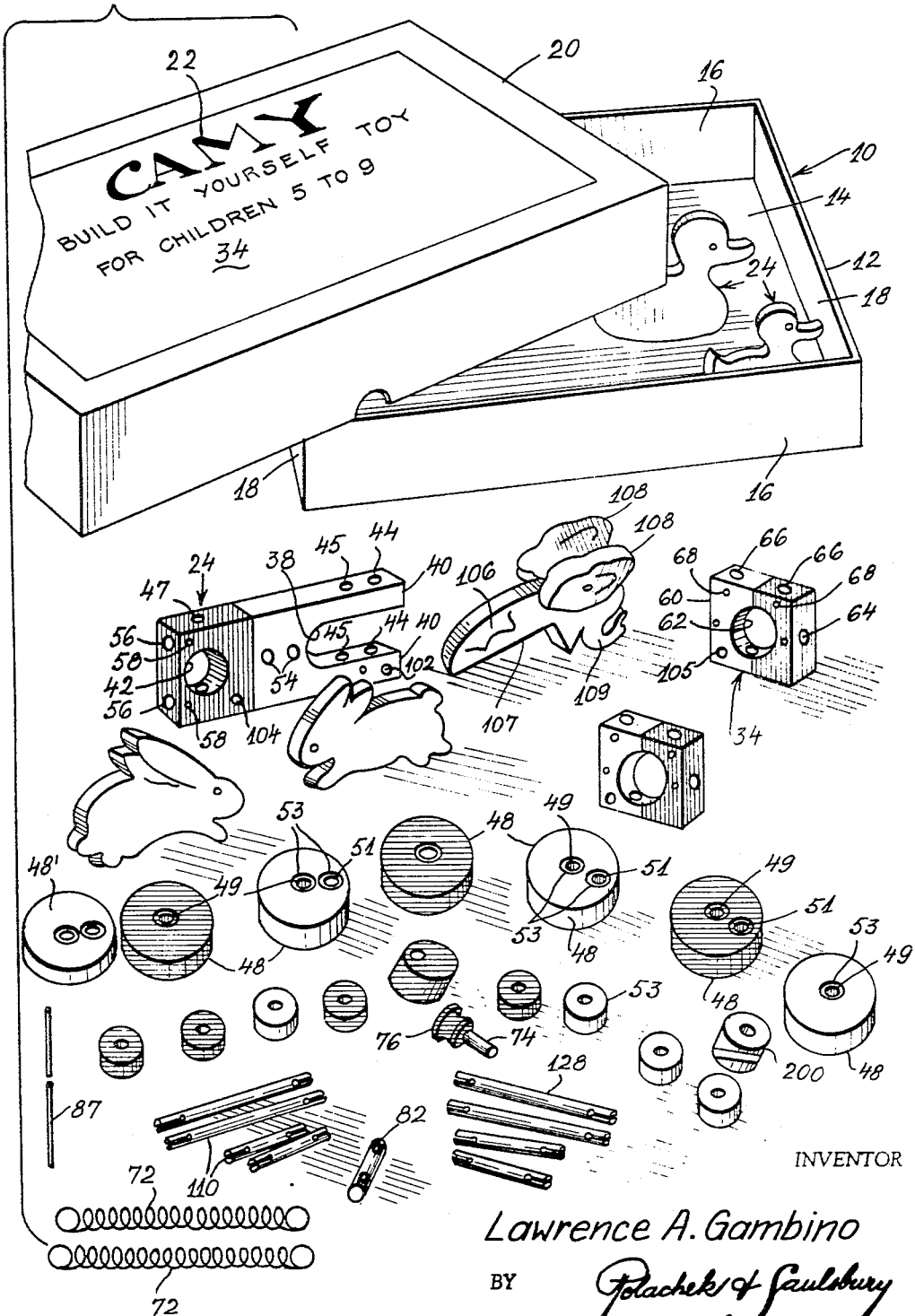
INVENTOR
Lawrence A. Gambino
BY Polachek & Saulsbury
ATTORNEYS

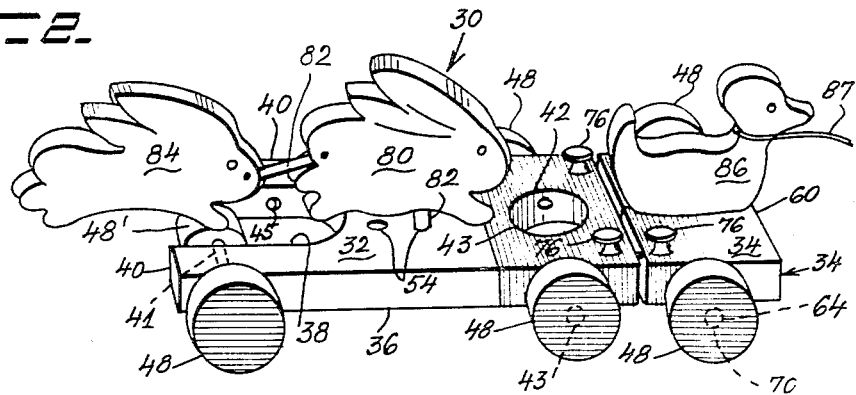

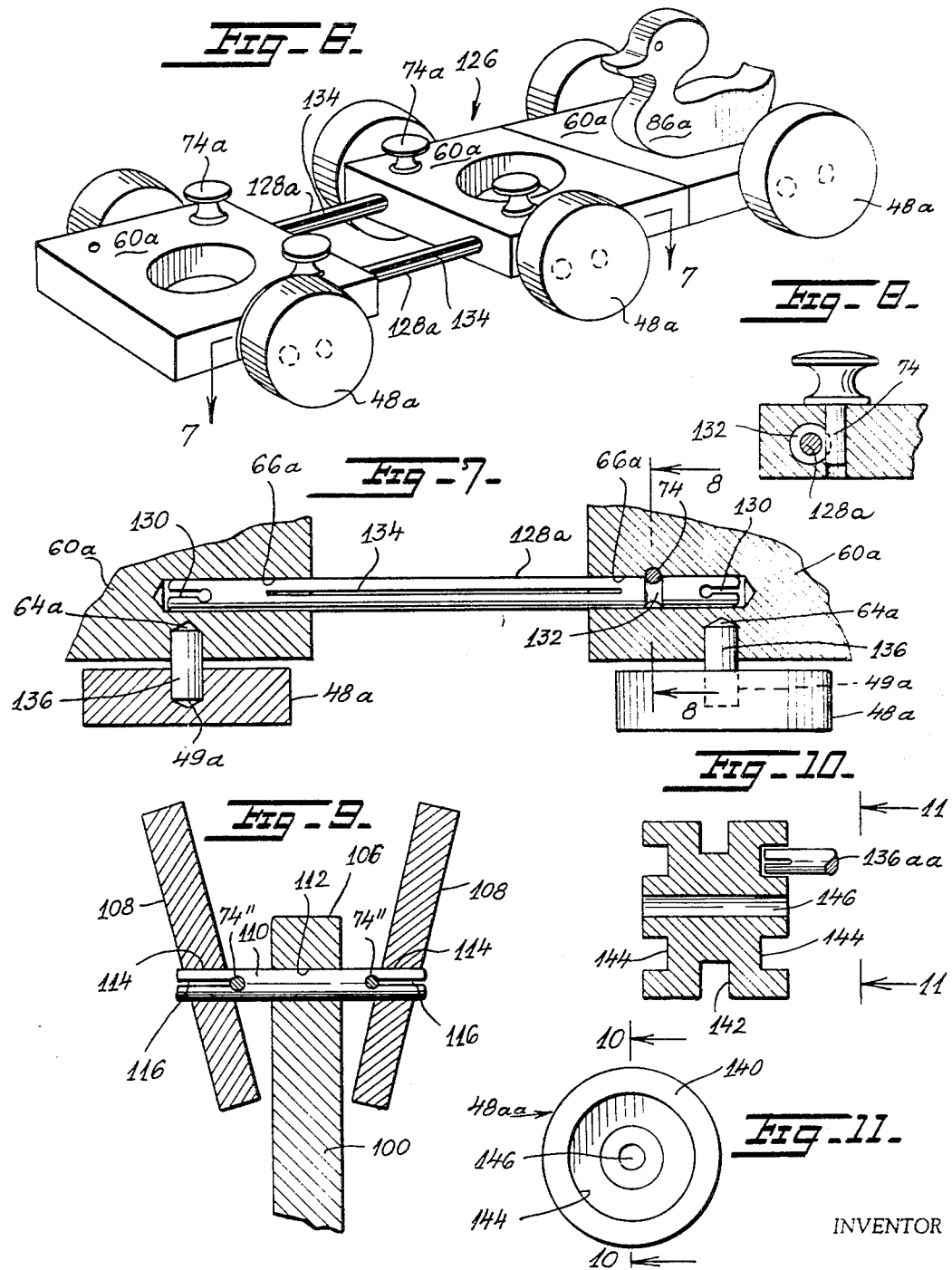

Oct. 21, 1969
L. A. GAMBINO
3,473,257
CHILDREN'S BUILD-IT-YOURSELF TOY
Filed July 24, 1967
4 Sheets-Sheet 4
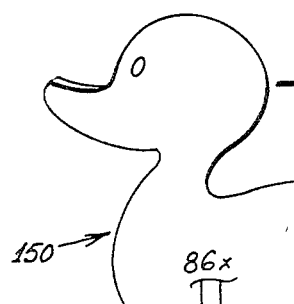
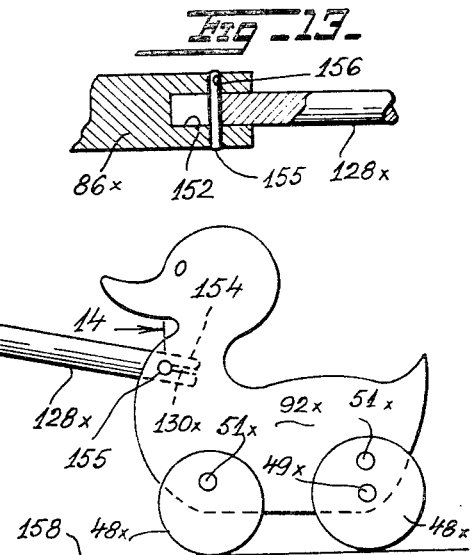
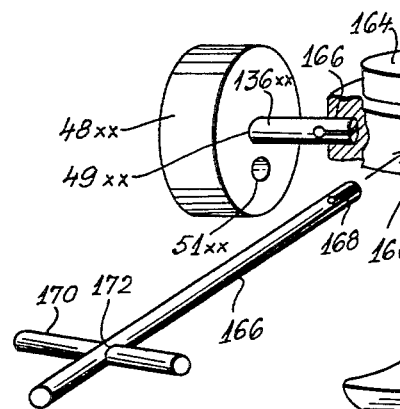
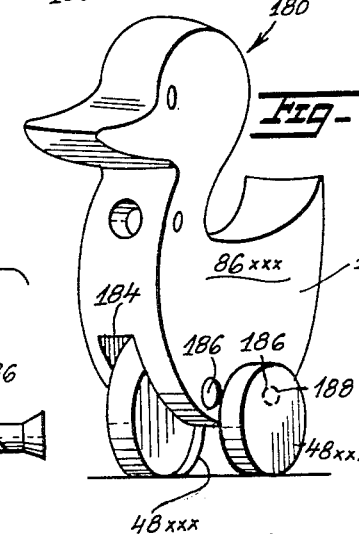
INVENTOR
Lawrence A. Gambino
BY Postachek & Saulsbury
ATTORNEYS United States Patent Office 3,473,257
Patented Oct. 21, 1969

3,473,257
CHILDREN'S BUILD-IT-YOURSELF TOY
Lawrence A. Gambino, 57 Hunter's Lane,
Huntington Station, N.Y. 11746
Filed July 24, 1967, Ser. No. 655,616
Int. Cl. A63h 11/10
U.S. Cl. 46—104                                    1 Claim

ABSTRACT OF THE DISCLOSURE

A movable animal toy for children having a flat wheeled body. The body is slotted and perforated to support figures of smaller animals such as rabbits and ducks. According to a modification, a mutilated figure of an elephant is supported on the body. The wheels are on the sides of the body of the toy. The invention contemplates marketing the parts of the animal in a kit to be assembled by a child.

---

It is well known that children are intrigued by toys, involving some fictional personification of everyday life, such as animals and the like representing some existing thing in their experience. It is equally known that children are intrigued by devices they themselves can make and operate and which gives some positive result in their action. It is the purpose of this invention to capitalize on these human characteristics to overcome childish reluctances and to inculcate good habits.

An important object of the present invention is to provide a children's toy of this kind and the method of making the same.

Another object of the invention is to provide a kit with a plurality of pieces adapted to be assembled by a child to build a toy.

BRIEF DESCRIPTION OF THE VIEWS
OF THE DRAWINGS

FIGURE 1 is a spread perspective view of a kit of the present invention with the kit partly opened and contents partly removed and scattered.

FIG. 2 is a top perspective view of a first toy made from the contents of the kit of FIG. 1.

FIG. 3 is a side elevational view of a second toy made from the contents of FIG. 1.

FIG. 4 is a top perspective view of a third toy made from the contents of the kit of FIG. 1.

FIG. 5 is a side elevational view of a fourth toy made in accordance with the invention.

FIG. 6 is a top perspective view of a fifth toy made in accordance with the invention.

FIG. 7 is an enlarged sectional view taken on the plane of the line 7—7 of FIG. 6.

FIG. 8 is a vertical sectional view taken on the plane of the line 8—8 of FIG. 7.

FIG. 9 is a vertical sectional view taken on the plane of the line 9—9 of FIG. 4.

FIG. 10 is a vertical sectional view taken on the plane of the line 10—10 of FIG. 11 of a wheel constituting a sixth modification of the invention.

FIG. 11 is an elevational view of one of the wheels.

FIG. 12 is a part side elevational and part diagrammatic view of a seventh toy made in accordance with the invention.

FIG. 13 is a sectional view taken on the plane of the line 13—13 of FIG. 12.

FIG. 14 is a vertical sectional view taken on the plane of the line 14—14 of FIG. 12, on an enlarged scale.

FIG. 15 is a top perspective view, parts being shown broken away and parts being disassembled of an eight toy made in accordance with the invention.

FIG. 16 is a top perspective view of a ninth toy made in accordance with the invention.

FIG. 17 is a vertical sectional view of one of the wheels of FIG. 16 showing a step in the assembly of the toy in FIG. 16.

FIG. 18 is a side perspective view of a wheel constituting a tenth modification of the invention, parts being shown broken away.

DETAILED DESCRIPTION OF THE
DRAWINGS

Referring now in detail to the various views of the drawings, in FIG. 1 there is shown a kit 10 embodying the present invention. The kit is in the form of a shallow rectangular box-like body 12 of cardboard or other suitable material having a bottom wall 14, side walls 16, 16 and end walls 18, 18 and being open at the top. A flanged cover 20 is adapted to fit over the box-body to close the same. The top surface of the cover 20 may have indicia 22 printed thereon identifying the contents of the box.

It is contemplated that a plurality of toy pieces or parts 24 be supplied in the kit in orderly fashion. These pieces or parts constitute the playing pieces or parts from which the child makes the toy or toys. Any number of duplicate parts or pieces may be placed in the kit, depending upon the size thereof. The parts or pieces may be made of wood, plastic or other suitable material.

In FIG. 2, a toy 30 made from the pieces or parts 24 is shown. The toy 30 comprises a main body part 32 and a tandem extension or auxiliary body portion 34 at one end of the main body part. The main body part has a flat rectangular shaped body 36 with a central slot 38 formed at one end thereof, intersecting said end and forming bifurcated end portions 40, 40. The body 36 is also formed with a round hole 42 at the other end thereof in line with the slot 38. Spaced passages 44, 45 and 47 are formed across the body 36 at its ends, the passages 44 and 45 intersecting the slot 38 and the passage 47 intersecting the hole 42 in order to receive and support axles 41 and 43, respectively, said axles carrying wheels 48 on the ends thereof, at the sides of the main body part 32. In addition, the axle 41 carries a wheel 48' in the slot 38. All of the wheels 48 are formed on one side surface thereof with a concentrically arranged recess 49 and some of the wheels are formed with a second recess 51, offset from the central recess 49. The recesses 49 and 51 may seat sleeves or bearing bushings 53. Some of the wheels 48 are preferably colored. The main body part 32 is also formed with a pair of aligned holes 54, 54 between the inner end of the slot 38 and the hole 42, extending from the top to the bottom of the body, and is forme dwith sockets 56, 56 in the end edge thereof adjacent the hole 42, the sockets being positioned adjacent the sides of the main body. Sockets 58 are formed in the top surface of the body 32 intersecting the sockets 56, 56.

The tandem extension 34 has a flat rectangular body 60 with a round hole 62 centrally thereof and with a passage 64 extending through the longitudinal center thereof, intersecting the hole 62. The body 60 is formed with sockets 66, 66 adjacent one side thereof, the sockets being positioned adjacent the ends of the body 60. Sockets 68, 68 are formed in the top surface of the body 60 intersecting the sockets 66, 66. An axle 70 extends through the passage 64 and outwardly of the body of the tandem extension and carries a pair of wheels 48 on its outer ends, the ends of the axle extending into the central recess 49 of the wheels.

The main body part 32 and the body of the tandem extension 34 are joined by elongated coiled springs 72, 72 extending between said parts with their ends fitted in the aligned recesses 56 and 66 in the main body 32 and body of the tandem extension, respectively. Pins 74 with hand knobs 76 extend downwardly through the sockets 58 and 68 and into the end convolutions of the springs 72, 72 thereby holding the springs in position.

In accordance with the invention, a series of animal figures is supported on top of the main body part 32 and of the tandem extension 34. As shown, a figure of a rabbit 80 is mounted on the top of a wooden peg 82 the bottom end of the peg being fitted in one of the holes 54 in the body of the main part 32. The rabbit is facing toward the tandem extension 34. Another figure of a rabbit 84 with his front legs fixed to the side of the wheel 48′ eccentrically mounted on axle 41 in the slot 38 is shown. A figure of a duck 86 is shown seated in the central round hole 62 in tandem extension 34, the rabbits and duck facing in the same direction toward the right as shown in FIG. 2. A string 87 may be fastened around the neck of the duck 86 for pulling the toy along its supporting surface, or the end rabbit 84 may be manually pushed by hand over the surface. When the toy is rolling on its supporting surface, the eccentric mounting of the wheel 48′ on axle 41 causes the end rabbit 84 to move up and down as will be understood.

Another modified form of toy 30′ made from the parts and pieces 24 of FIG. 1 is shown in FIG. 3. The toy 30′ is somewhat similar to the toy 30 of FIG. 2 differing in that the animal figure mounted on the wheel 48′ on the rear axle 41 is a baby duck 92, instead of a figure of a rabbit. Furthermore, the animal figure mounted in a hole 54 in the body 36′ of the main body part 32′ is the figure of a duck, a mama duck 86′, instead of a figure of a rabbit. The animal figure mounted in the hole in the body of the tandem extension 34′ is that of the rabbit 80′. Otherwise the toys 30′ and 30 are similar and similar reference numerals are used to indicate similar parts throughout.

In the modification of the toy 30″ shown in FIGS. 4 and 9, the main part 32″ and tandem extension 34″ are joined and mounted along their end edges to support a figure of an elephant or "Elf" 100. The wheels 48″, 48″ are supported on axles extending through a passage 102 in one bifurcated end 40″ of the main body part 32″ and through a similar passage 104 adjacent the other end of the main body part, the axles extending outwardly of the main body part and the wheels fixed on the outer ends of the axles. The other wheel 48″ is mounted on an axle extending through a passage formed in the body of the tandem extension 34″ and projecting outwardly of said body. The body of the elephant or "Elf" has a cutout portion 107 conforming to the shape of the body of the tandem extension 34″ fitting thereover and being fixed thereto in any suitable manner. The body of the elephant has a flat elongated body 106 with elephantine ears 108 disposed at an angle to the vertical, and with a trunk 109. The ears are joiner to the body by an elongated pin 110 extending through a passage 112 in the body of the elephant and extending through holes 114, 114 in the ears 108. The pin is formed with slots 116, 116 intersecting the ends and the ears are held in position by pins 74″ extending through the slots inwardly of the ears as seen in FIG. 9.

FIG. 5 illustrates another modified form of toy 30‴ made from the contents of kit 10 of FIG. 1. The main body part 32‴ forms the body of the toy. One end of the body 32‴, the left hand end, is mounted on an axle journalled in the offset recess of a pair of wheels 48‴, and the other end, the right hand end, is mounted on an axle journalled in the center recess of a pair of wheels 48‴. A mama duck 86‴ is seated in the bifurcated end of the main body part, and a baby duck 92‴ is mounted in the perforated end thereof. The mama duck is thus elevated above the baby duck. The ducks are joined by an end slotted elongated pin 128 and fastening pins 84‴ passing through holes in the body of the ducks and extending through the slots in the ends of the pin 128.

In FIGS. 6 to 8, inclusive, still another modified form of toy 30a is shown formed of three of the tandem extensions 60a placed end to end. One end extension 60a, the left hand end as viewed in FIG. 6, is connected to the intermediate extension 60a in spaced relation by means of two elongated pins 128a slotted at their ends as indicated at 130 and formed with annular grooves 132 inwardly of the slots 130. Each pin is formed with an elongated closed slot 134 along the center thereof. Slot 134 makes the pin more flexible. The slotted ends of the pin are inserted into the opposed recesses 66a in the bodies of the extensions 60a. Headed pins 74 extending through the recesses 68a in the body of the extension and into the grooves 132 in the pins 128a hold the pins in position. Wheels 48a having central sockets 49a are mounted on the ends of stub axles 136, the other ends of the axles being journalled in sockets 64a in the bodies of the extensions 60a.

The other end tandem extension 60a is connected to the intermediate extension 60a in any suitable manner and supports a duck 86a in its central hole (not shown). The wheel 48a is mounted on the extension similarly to the wheels 48a on the other extensions.

In FIGS. 10 and 11, a modified form of wheel 48aa adapted to be used with the toy 30″ of FIG. 4 is shown. The wheel 48aa has a round body 140 with a central groove 142 around the periphery thereof and with opposed annular grooves 144 in the side surfaces thereof. A bore 146 extends through the center of the body. The outer end of the stub axle 136aa may be positioned in the annular groove 144 in the inner surface thereof whereby the main body portion of the toy is given an eccentric movement, when the wheel is rolling on its supporting surface.

Still another modified form of toy 30x is shown in FIGS. 12 to 14, inclusive. The toy 30x comprises a mama duck 86x and a baby duck 92x joined in tandem by an elongated pin 128x slotted at its ends as indicated at 130x. The slotted ends of the pin are inserted into sockets 152 and 154 in the opposite ends of the ducks 86x and 92x, respectively. Pins 155 extend through holes 156 in the bodies of the ducks and through the slots 130x in the ends of the pin hold the pin in place. The baby duck is mounted on wheels 48x with central socket 49x and with eccentric socket 51x, at the rear thereof, and with a wheel 48x having an eccentric socket 51x at the front thereof, for rolling on a horizontal surface 158. The mama duck 86x is provided with a spare pin 74x and a spare stub axle 136x, adapted to extend through the eccentrically arranged recess in waddle core 200 (FIG. 1) for connecting the same.

FIG. 15 illustrates still another modified form of toy 30xx comprising a circular flat body 162 with an upstanding circular hub portion 164 at the top of the body. The periphery of the body is formed with spaced sockets 166 to support stub axles 136xx supporting wheels 48xx on the outer ends thereof, the axles being journalled in central sockets 49xx in the wheels. The wheels are also provided with eccentric sockets 51xx which may be used if eccentric movement of the body is desired. An elongated shaft 166 having a slotted end 168 is adapted to have its slotted end inserted into one of the peripheral sockets 166 for pulling the toy 30xx as a wagon. A cross pin 170 is placed through a hole 172 in the other end of the shaft to facilitate manual pulling of the toy.

In FIGS. 16 and 17, yet another modified form of toy 30xxx is shown comprising a duck 86xxx having a generally semiround body 182 with an elongated closed slot 184 in the bottom peripheral edge thereof. A pair of wheels 48xxx is positioned in the slot and supported on axles in the form of pins 186 extending across the slot. The axles extend through aligned holes 188 in the body of the duck and in the case of the left hand wheel, as viewed in FIG. 16, through a central hole 49xxx in the wheel and in the case of the right hand wheel through an eccentric hole 51xxx in the wheel.

Another modified form of wheel 48a' is shown in FIG. 18. The wheel 48a' differs from the form of wheel 48 shown in FIG. 1 in that in addition to the central socket 49a' and the eccentric socket 51a', a hard rubber band 196 is fitted over the periphery of the body of the wheel.

I claim:

1. A toy comprising a wheeled body, means on the body supporting at least one animal figure thereon, the wheeled body being constituted by two pairs of wheels in alignment, the means supporting said animal figure thereon including axles connecting the individual wheels of the pair of wheels and being offset from the center of said wheels, the animal figure being constituted by the representation of a duck, said representation having a first set of holes in the body offset from the center of said body, said holes receiving said axles, an elongated pin extending from one end of said duck representation, a representation of a second duck supported on the other free end of said pin, and means fastening the ends of the pin to the duck representations, said fastening means comprising slots in the ends of the elongated pin, and pins extending through a second set of holes in the bodies of the duck representations and through said slots.

References Cited

UNITED STATES PATENTS

| | | | |
|---|---|---|---|
| 1,370,303 | 3/1921 | Gillespie | 46—22 |
| 2,132,647 | 10/1938 | Robins | 46—26 |
| 2,510,884 | 6/1950 | Greene. | |
| 3,355,837 | 12/1967 | Pendersen. | |
| 2,529,692 | 11/1950 | Holmes | 46—22 |
| 2,978,832 | 4/1961 | Berberich | 46—107 |

FOREIGN PATENTS

| | | |
|---|---|---|
| 264,426 | 1/1927 | Great Britain. |
| 485,218 | 7/1952 | Canada. |

OTHER REFERENCES

Makit Toys, from Playthings, March 1959, p. 200.

ROBERT PESHOCK, Primary Examiner

H. DINITZ, Assistant Examiner